United States Patent
Legrand et al.

(10) Patent No.: US 6,674,822 B1
(45) Date of Patent: Jan. 6, 2004

(54) SEARCHING THE OPTIMAL SAMPLING INSTANT IN A TDMA PACKET TRANSMISSION SYSTEM

(75) Inventors: Delphine Legrand, Paris (FR); Americo Brajal, Villeneuve-le-Roi (FR); Antoine Chouly, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 387 days.

(21) Appl. No.: 09/688,643

(22) Filed: Oct. 16, 2000

(30) Foreign Application Priority Data

Oct. 20, 1999 (FR) .......................................... 99 13088

(51) Int. Cl.$^7$ ................................................ H04L 7/00
(52) U.S. Cl. ..................................................... 375/355
(58) Field of Search ................................. 375/355, 326, 375/316, 317, 320

(56) References Cited

U.S. PATENT DOCUMENTS

| | | | | |
|---|---|---|---|---|
| 4,389,727 A | * | 6/1983 | Rouffet | 375/359 |
| 5,671,257 A | * | 9/1997 | Cochran et al. | 375/355 |
| 5,835,541 A | * | 11/1998 | Namekata et al. | 375/355 |
| 5,963,603 A | * | 10/1999 | Li et al. | 375/355 |
| 6,359,878 B1 | * | 3/2002 | Lakkis et al. | 370/350 |
| 6,430,235 B1 | * | 8/2002 | O'Shea et al. | 375/326 |

FOREIGN PATENT DOCUMENTS

| | | | |
|---|---|---|---|
| EP | 0942553 A2 | 9/1999 | .......... H04L/7/033 |
| WO | WO9107831 | 5/1991 | ............. H04L/7/00 |
| WO | WO9301667 | 1/1993 | .......... H04L/7/033 |

OTHER PUBLICATIONS

"Digital Communication Receivers Synchronization Channel Estimation and Signal Processing", by H. Meyr, et al., Wiley Series Editions in Telecommunications and Signal Processing, pp. 283–289.

\* cited by examiner

Primary Examiner—Don N. Vo
(74) Attorney, Agent, or Firm—Daniel J. Piotroski

(57) ABSTRACT

A system and method is disclosed for transmitting TDMA packets between interactive terminals and a head station using a transmission medium. The system includes an iterative method for determining an optimal sampling instant by computing the average amplitudes only for a predetermined number of the input samples, determining a maximum of the average amplitudes of these samples, deriving an approximation of the optimal sample using the maximum, repeating the average amplitude computation for input samples between the approximation and a neighboring sample whose previously computed average amplitude is the largest, and comparing of the result of each average amplitude computation with a previously computed maximum corresponding to the previous approximation for deriving a new approximation of the optimal sample.

8 Claims, 4 Drawing Sheets

SEARCHING THE OPTIMAL SAMPLING INSTANT IN A TDMA PACKET TRANSMISSION SYSTEM

BACKGROUND OF THE INVENTION

The invention relates to a device for searching the optimal sampling instant intended to retrieve a sample, referred to as optimal sample, from input samples and comprising an amplitude-computing member for computing the average amplitudes of the input samples.

The invention also relates to a receiver for a packet transmission system intended to receive data packets representing symbols transmitted by a terminal or a head station, the receiver comprising a sub-sampling device for generating a plurality of input samples from the received data.

The invention further relates to a packet transmission system comprising at least one terminal and a head station.

The invention finally relates to a method of recovering the optimal sampling instant intended to retrieve a sample, referred to as optimal sample, from input samples, comprising a step of computing the amplitude for determining the maximum of the average amplitudes of these samples and for deriving the optimal sample.

The invention finds important applications in the field of satellite or cable transmissions and notably in return path transmissions in which a plurality of terminals is capable of transmitting data packets to a head station in accordance with a time-division multiplex mechanism.

The article entitled "Digital Communication Receivers Synchronization Channel Estimation and Signal Processing" by H. Meyr, M. Moeneclay and S. Fechtel published in the Wiley Series editions in Telecommunications and Signal Processing describes on pages 283 to 289 a technique for computing the optimal sampling instant. In the majority of time-division transmission systems it is necessary to effect a sub-sampling at the receiver end so as to retrieve the sampling instant used at the transmitter end. The technique described in the quoted article recommends computation of the average energies of each sample for selecting the optimal sample having the maximum average energy. This technique is costly as regards the number of computations because it necessitates a computation of the average energy for all the samples before a decision on the optimal sample is made.

SUMMARY OF THE INVENTION

It is an object of the invention to provide a very rapid recovery of the optimal sampling instant by considerably limiting the number of computations and thus the operating costs. To this end, a device as described in the opening paragraph is characterized in that the computing member uses only one part of the input samples for determining the optimal sample having the maximum average amplitude among all the input samples. Thus, instead of computing the average energies of all the input samples, the computation is effected for several predetermined samples only.

In accordance with an important characteristic feature of the invention, the device for searching the optimal sampling instant comprises:

- a device for taking predetermined input samples to be supplied to the computing member with a view to determining the sample having the maximum average amplitude, referred to as approximate maximum,
- a selector for selecting a supplementary input sample comprised between the approximate maximum and the neighboring sample whose previously computed average amplitude is the largest and for supplying said sample to the computing member with a view to computing its average amplitude, and
- a comparator for comparing the average amplitude of the selected sample with the previous approximate maximum and for deriving a new approximate maximum.

In accordance with a preferred embodiment of the invention, the supplementary sample is situated midway between the last approximate maximum and the neighboring sample whose previously computed average amplitude is the largest. This embodiment has the advantage that the precision of the searched maximum is improved by a factor of 2 upon each iteration of computing the amplitude, i.e. for every new selected sample.

In accordance with a characteristic feature of the invention related to this embodiment, the number of input samples is an integral multiple L of the integer,N, with $N=2^n$, characterized in that the predetermined number of samples among the N input samples is an integer L×M, with $M=2^m$ and 2<M<N, and in that the optimal sample is obtained at the end of a number of average amplitude computations which is equal to M+n−m. By using powers of 2, both for the number of input samples and for the predetermined number of samples, the number of computations necessary for ending the search of the sample is thus much lower and predefined in accordance with a simple relation and is proportional to the logarithm to the base 2 of the sampling operation N.

The invention has the advantage of a very rapid recovery of the optimal sampling instant, which operation can be carried out for every new packet received from anyone of the terminals of the system.

These and other aspects of the invention are apparent from and will be elucidated, by way of non-limitative example, with reference to the embodiments described hereinafter.

DESCRIPTION OF THE PREFERRED EMBODIMENTS

Figure 1:
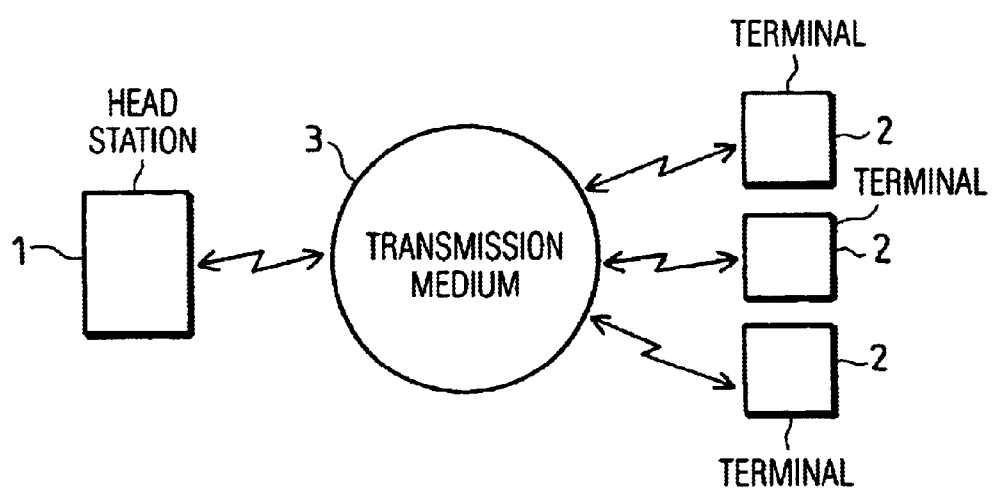
FIG. 1 shows an embodiment of the transmission system according to the invention.

A transmission system according to the invention is shown by way of example in FIG. 1. It comprises a head station 1 and a plurality of interactive terminals 2 which can transmit and receive data to and from the head station by using a transmission medium 3. The transmissions from the terminals to the head station are qualified as ascending transmissions. The transmissions from the head station to the terminals are qualified as descending transmissions. In the ascending transmissions, the head station 1 has the function of a receiver. In the descending transmissions, the terminals are the receivers. Access of the terminals to the transmission medium is effected, for example, by using a frequency-division multiple access mechanism combined with a time-division multiple access. The transmission medium may be of different types, for example, cable, radio or satellite transmissions.

In a time-division packet transmission system, different terminals may transmit data in consecutive time intervals with different sampling instants because their transmission clocks are not synchronous. Moreover, these clocks are liable to present a certain jitter. Two packets transmitted by the same transmitter thus do not necessarily have the same sampling instant. Moreover, distortions in the channel may cause a shift upon arrival. The head station or the receiver (which may be another terminal in the case of a point-to-point system) must thus effect a sub-sampling, i.e. use a multiple clock of the theoretical sampling frequency for retrieving the sampling instant used at the transmitter end. For example, the sub-sampling frequency may be 16 times higher than the symbol frequency, which means that 16 samples must be extracted from the received signal corresponding to a transmitted symbol. The optimal sampling instant may vary from one packet to another, which is the reason why the head station has too little time to retrieve the optimal sampling instant, i.e. the sample corresponding to the symbol transmitted by the source, here the different terminals. The invention notably has the advantage that the optimal sampling instant can be retrieved more quickly than in the majority of conventional methods by considerably reducing the number of operations to be performed. The conventional methods consist of computing the average energy of the 16 samples in accordance with a computation which varies as a function of the method employed and of selecting the sample having the maximum amplitude from the 16 samples.

Figure 2:
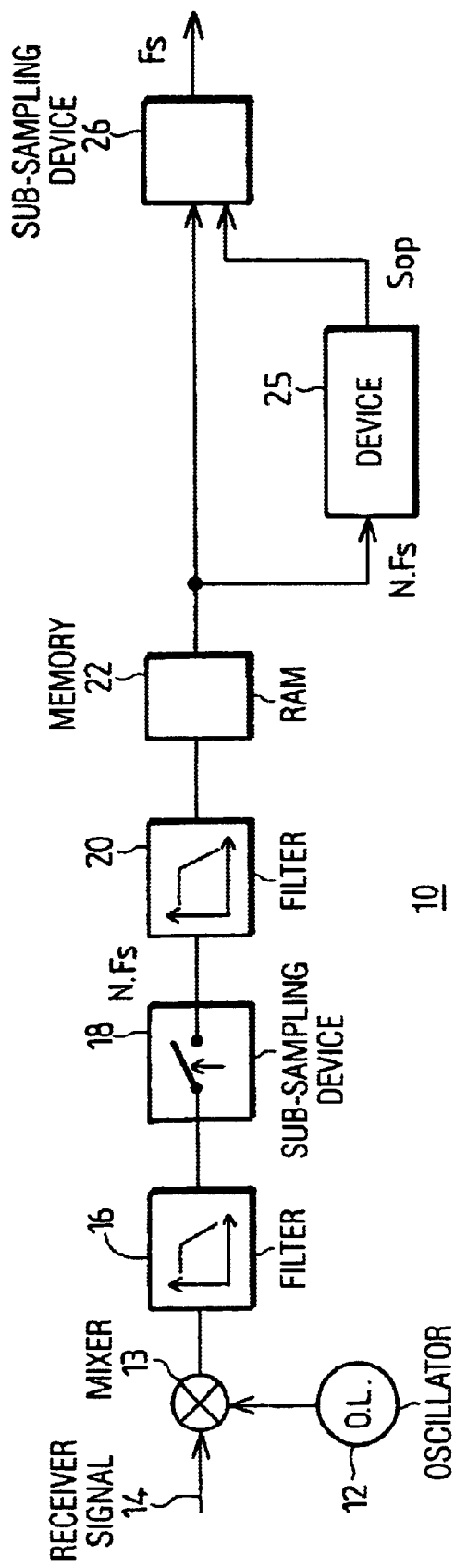
FIG. 2 is a general diagram of an embodiment of a receiver comprising a device for searching the optimal sampling instant according to the invention.

FIG. 2 is a general circuit diagram of a receiver 10 according to the invention. It comprises a local oscillator 12 and a mixer 13 for transposing the received signal 14 in such a way that the spectrum of the transposed signal is centered at zero plus or minus a frequency error $\Delta f$ caused by the fact that the local oscillators used for transmitting at these carrier frequencies are not perfect. The transposed signal is filtered by a rejection filter 16 so as to eliminate the image frequencies around 2 Fp where Fp is the transmission frequency, i.e. the theoretical carrier frequency of the received signal, as well as the other carriers which are used in the system. The signal obtained at the output of the filter 16 is sampled by a sub-sampling device 18 having a factor of N which takes N samples, denoted $S_0$ to $S_{15}$ for each symbol of the transposed signal. The samples taken are subsequently filtered by a filter 20, referred to as optimal filter, adapted to the filter used at the transmitter end. It is a low-pass filter of the Nyquist edge type centered around zero. The filtered signal is subsequently stored in a memory 22. A device 25 for searching the optimal sampling instant is provided to search the optimal sample, i.e. the sample corresponding to the transmitted symbol so as to enable a sub-sampling device 26 to select the optimal sample $S_{op}$ from the samples stored in the memory 22. The number of stored samples, available at the input of the device 25 for searching the optimal sampling instant is equal to L×N, where L is the number of transmitted symbols corresponding to the sub-samples and which corresponds to an observation window which is equal to L×$T_s$ where $T_s$ is the duration of a symbol. The device 25 for searching the optimal sampling instant receives the samples at N times the symbol frequency $F_s$ and supplies information on the position of the optimal sample $S_{op}$ to the sub-sampling device.

Figure 3:
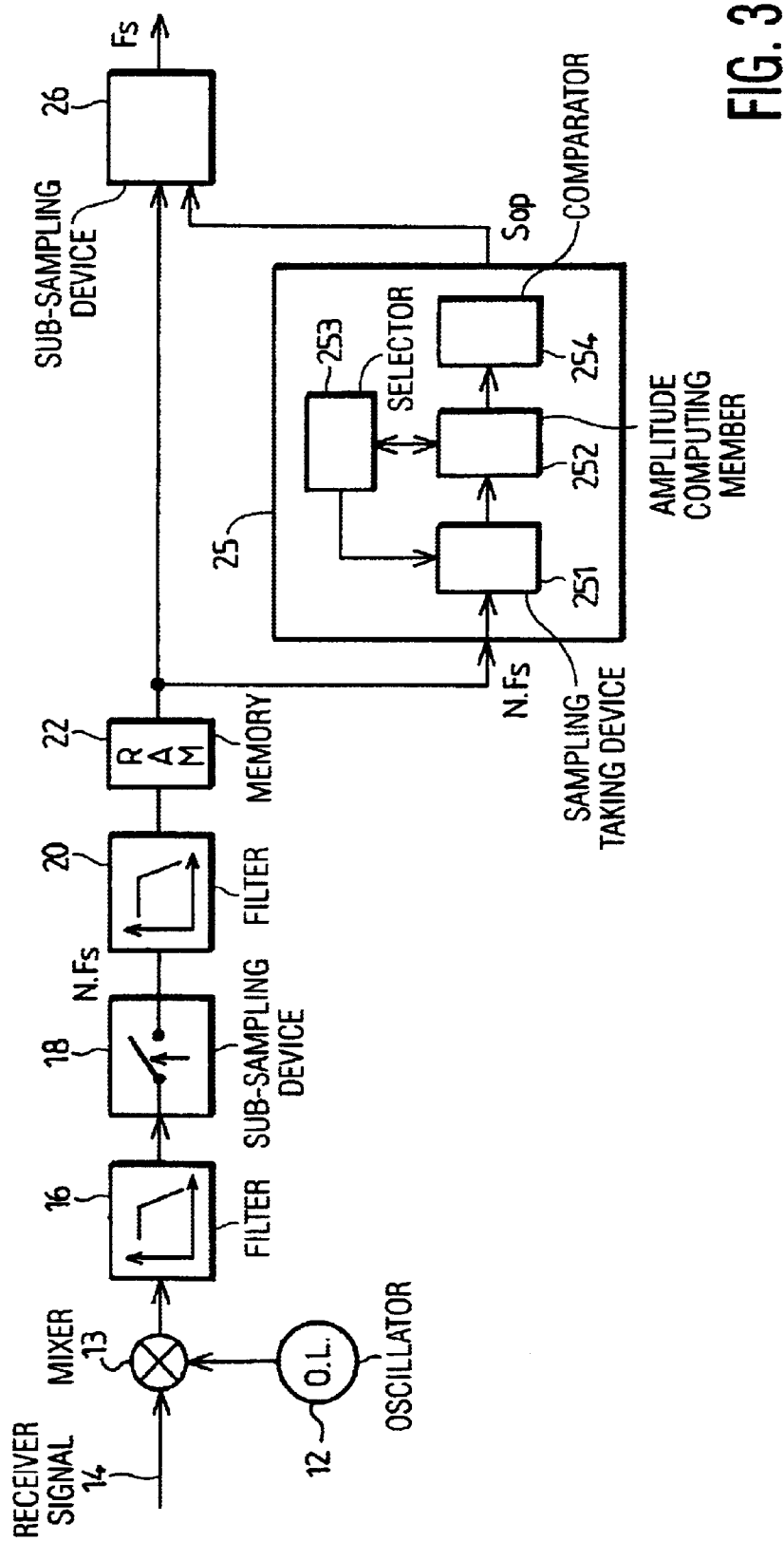
FIG. 3 shows an embodiment of the receiver of FIG. 2.

A preferred embodiment of a receiver as shown in FIG. 2 is shown by way of example in FIG. 3. In accordance with this embodiment, the device 25 for searching the optimal sampling instant comprises, for example, in a digital signal processor DSP:

a device 251 for taking the samples from the input samples stored in the memory 22 and particularly for taking L×M predetermined samples (M being independent of N) from the L×N input samples stored in the memory 22, to be supplied to a computing member 252, an amplitude-computing member 252 for computing the average amplitudes of the taken samples by determining the maximum and by deriving an approximation of the optimal sample, or approximated maximum, which approximation is denoted $S_j$, a selector 253 co-operating with the sample-taking device 251 for selecting and taking the input samples comprised between the last approximation and the neighboring sample whose previously computed average amplitude is the largest with a view to computing their average amplitude, and a comparator 254 for comparing the average amplitude of each selected sample with the maximum of the previously computed average amplitudes corresponding to the previous approximation and for deriving a new approximation of the optimal sample.

Each member 251 to 254 may be realized in different hardware components or by means of circuits programmed in an appropriate manner or with the aid of software means.

The computation of the amplitude is thus iterated for selected samples as a function of their position with respect to the last obtained approximation. They are comprised between the first approximation obtained from the L×M predetermined samples and the neighboring sample whose average amplitude, which has already been computed, is the largest. For the first series of computations, the neighboring sample is one of the M predetermined samples. For every subsequent iteration, it is supplied from all the samples whose average amplitude has already been computed.

The optimal sample is thus retrieved by means of successive approximations without having to compute the amplitudes of all the stored samples. This is possible because the function representing the average amplitudes of all the samples has only a single global maximum and does not have a local maximum. The invention thus recommends to start from a first series of computations for L×M points or predetermined samples (with 2<M<N) from the L×N stored samples. Preferably, M and N are powers of 2: $N=2^n$, $M=2^m$ with 2<M<N, and the L×M samples are uniformly spread in the computation period L×$T_s$ so that there is always a sample among the stored samples, situated midway between two of the L×M predetermined samples.

The result is independent of the method used by the computing member 252 for computing the average amplitude. One may use, for example, the square power method which, for each sample, consists of computing the sum of the square power of all the samples comprised in a computation window and having the same position in the received packet, i.e. spaced apart by the duration of the transmitted symbol, denoted $T_s$, or the method referred to as eye diagram, in which instead of computing the sum of the square powers, the sum of the absolute values is computed. The sample having the index j and denoted $S_j$ with the largest average amplitude is then memorized. It constitutes an approximation of the optimal searched sample $S_{op}$. Each successive iteration provides a new approximation of the optimal sample which may be equal to the previous approximation. Indeed, the computing member 252 performs a supplementary amplitude computation for a supplementary sample selected from the N stored samples, comprised between the last computed approximation and that of the two neighboring samples having the indices j−i and j+i and denoted $S_j-i$ and $S_j+i$ for which the average amplitude, which has already been computed during a previous iteration, has the largest amplitude. Preferably, the computed supplementary sample is the sample situated midway between the current approximation and the neighboring sample for which the average amplitude has the largest amplitude. The comparator 254 subsequently compares the new result obtained for the supplementary sample selected from the N stored samples with the current approximation so as to derive a new approximation of the optimal sample which is equal to the maximum between the current approximation and this new result. At every new iteration, the precision of the result is improved by a factor of 2. The optimal sample is retrieved by successive approximations at the end of a predetermined number of iterations which is equal to n−m, which means that M+n−m computations have to be performed. The computation of the M first predetermined samples is not taken into account as an iteration.

The invention is particularly advantageous for a sub-sampling factor which is equal to or higher than 8 by using a number of predetermined samples M which is at least equal to 4. For M=2, 2 samples $S_1$ and $S_2$ are preselected and it is impossible to decide whether the maximum of the amplitude is situated between $S_1$ and $S_2$ or between $S_2$ and $S_1$. By way of example, considering a sub-sampling factor which is equal to 16, i.e. $N=16=2^4$ and n=4, the memory 22 then contains 16 samples, denoted $S_0$ to $S_{15}$, which can represent the optimal sample, while the index represents the position or the sampling instant with respect to the local clock of the receiver. The invention recommends a first series of amplitude computations for the 4 samples $S_0$, $S_4$, $S_8$ and $S_{12}$, i.e. $M=4=2^2$ and m=2. At the end of M+N−m=2 iterations, the optimal sample is retrieved, i.e. at the end of the total number of 6 average amplitude computations. The number of computations is proportional to the logarithm to the base 2 of the sampling factor N.

Figure 4:
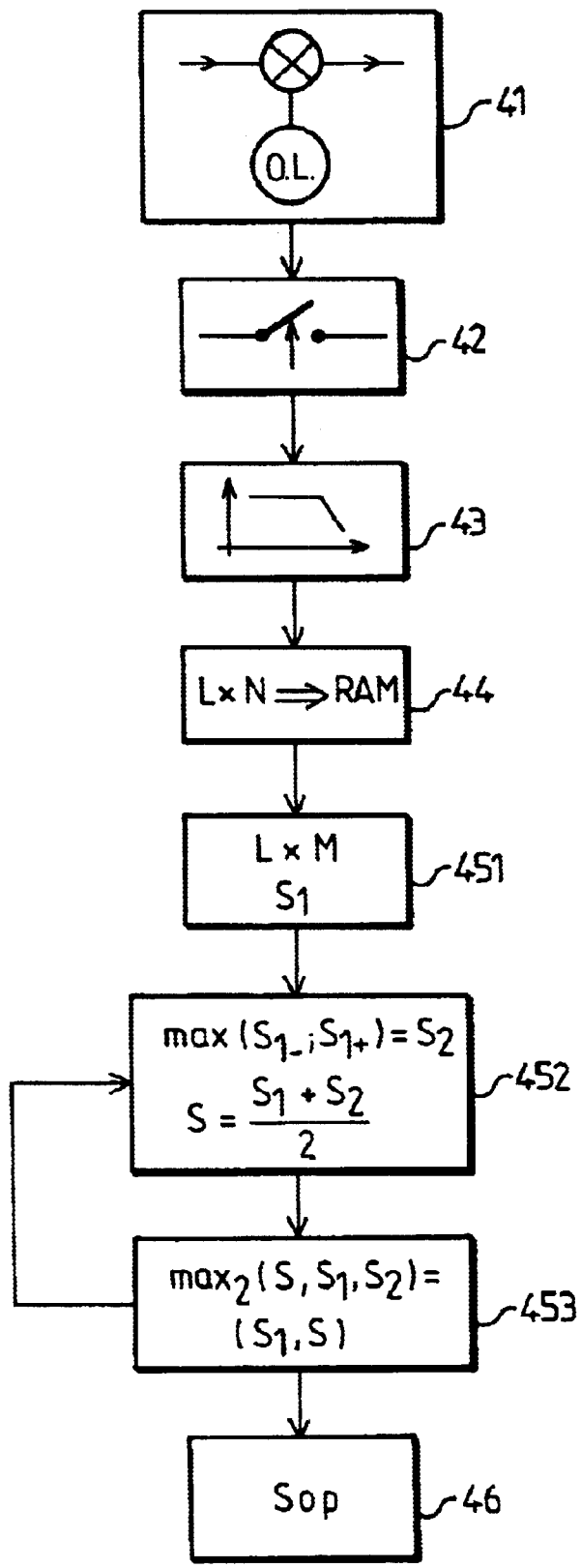
FIG. 4 shows an example of the method according to the invention.

FIG. 4 shows the different steps of a method of searching the optimal sampling instant at the receiver end according to the invention. This method comprises, in this order, the following steps:

step 40: reception of the signal comprising the data packets,
step 41: conversion of the received signal in the baseband,
step 42: sub-sampling of the baseband signal for obtaining N samples,
step 43: low-pass filtering by means of a Nyquist edge filter adapted to the filter used at the transmitter end,
step 44: storage of the L×N ($N=2^n$) samples,
step 45: search of the optimal sampling instant, denoted $S_{op}$,
step 46: sub-sampling by selecting only the optimal sample $S_{op}$ from the samples available in the memory.

The step 45 comprises the following sub-steps:

step 451: computation of the average amplitude from L×M predetermined stored samples, with $M=2^m$ corresponding to the samples indicated as k×N/M for $0 \leq M < M \leq N$ and selection of the sample denoted $S_1$, with the index $k_1 \times N/M$ and having the largest average amplitude, step 452: determination of the maximum amplitude among the neighboring samples of the sample $S_1$, denoted $S_1-$ and $S_1+$ whose average amplitudes have already been computed, i.e. between the sample indicated as $(k_1-1) \times N/M$ and the sample indicated as $(k_1+1) \times N/M$. The sample having the maximum average amplitude between $S_1-$ and $S_1+$ is denoted $S_2$ and its index is denoted $k_2$. If $S_1=0$, the sample with the index $(k_1-1) \times N/M$ is the sample with the index $(M−1)N/M$, and if $S_1=(M−1) \times N/M$, the sample with the index $(k_1+1) \times N/M$ is the sample 0. Subsequently, one computes the average amplitude of the sample S with the index $(K_1+k_2)N/2M$.

step 453: comparison of the average amplitudes of the samples S, $S_1$ and $S_2$ for preserving the two samples having the largest amplitude for the subsequent operations. At this state of iterations, the two samples to be preserved are S and $S_1$ because the function of the amplitude of the samples has only a single maximum so that the two largest are necessarily two consecutive samples. One then returns to step 452 for computing the amplitude of the sample S' situated midway between the two last selected samples, and so forth until the two last samples are adjacent samples among all the stored sample, i.e. when the number of supplementary iterations of computing the amplitude, without counting the first series of computations realized in step 451, is equal to n−m, or again at the end of a total number of computations which is equal to M+n−m. In the end, only the sample $S_{op}$ referred to as optimal sample and having the largest average amplitude is preserved.

What is claimed is:

1. A receiver for use in a transmission system intended to receive data transmitted by a terminal or a head station and comprising, that generates a plurality of input samples from the received data, the receiver comprising:
   a processor configured to search for an optimal sampling instant from received input samples, by (1) computing average amplitudes for only a predetermined number of input samples to determine a maximum average amplitude, (2) determining the optimal sample using the maximum average amplitude (3) selecting a supplementary input sample between the maximum and a neighboring sample whose previously computed average amplitude is the largest and for supplying said sample to the computing member to computing its average amplitude, and (4) comparing the average amplitude of the selected sample with the previous maximum and derive a new maximum.

2. The receiver as claimed in claim 1, wherein the supplementary sample is situated between the last maximum and the neighboring sample whose previously computed average amplitude is the largest.

3. The receiver as claimed in claim 1, wherein the input samples represent a transmitted symbol having a symbol duration.

4. The receiver as claimed in claim 3, wherein the predetermined samples are distributed in a time interval corresponding to the symbol duration.

5. A packet transmission system comprising:
   at least one terminal; and
   a head station, wherein the head station and/or the terminal comprises a receiver as claimed in claim 1.

6. A device for searching the optimal sampling instant intended to retrieve a sample, referred to as optimal sample, from input samples and comprising an amplitude-computing member for computing the average amplitudes of the input samples, wherein the computing member uses only one part of the input samples for determining the optimal sample having the maximum average amplitude among all the input samples, the device including a device for taking predetermined input samples to be supplied to the computing member with a view to determining the sample having the maximum average amplitude, referred to as approximate maximum, a selector for selecting a supplementary input sample comprised between the approximate maximum and the neighboring sample whose previously computed average amplitude is the largest and for supplying said sample to the computing member with a view to computing its average amplitude, and a comparator for comparing the average amplitude of the selected sample with the previous approximate maximum and for deriving a new approximate maximum, wherein the supplementary sample is situated midway between the last approximate maximum and the neighboring sample whose previously computed average amplitude is the largest, and wherein the number of input samples is an integral multiple L of an integer N, with $N=2^n$, and the predetermined number of samples among the N input samples is an integer L×M, with $M=2^m$ and $2<M<N$, and the optimal sample is obtained at the end of a number of average amplitude computations which is equal to M+n−m, where n and m are integers.

7. A method of recovering an optimal sampling instant from input samples, the method comprising the steps of:

computing average amplitudes of a predetermined number input samples;

determining a maximum of the average amplitudes of these samples;

deriving an approximation of the optimal sample using the maximum, repeating the average amplitude computation for input samples between the approximation and a neighboring sample whose previously computed average amplitude is the largest, and comparing of the result of each average amplitude computation with a previously computed maximum corresponding to the previous approximation for deriving a new approximation of the optimal sample.

8. The method as claimed in claim 7, wherein the number of input samples is an integral multiple L of an integer N, with $N=2^n$, and the number of predetermined samples among the N input samples is an integer L×M, with $M=2^m$ and $2<M<N$, and the optimal sample is obtained at the end of a number of iterations which is equal to n−m, where n and m are integers.

* * * * *